(12) United States Patent
Seo et al.

(10) Patent No.: US 7,526,018 B2
(45) Date of Patent: *Apr. 28, 2009

(54) MULTI-STANDARD TRANSCEIVER FOR SUPPORTING WIRELESS COMMUNICATIONS IN 2.3-2.4 GHZ BAND

(75) Inventors: Hae-Moon Seo, Yong-In (KR); Yong Kuk Park, Seoul (KR); Kwang-Ho Won, Yong-In (KR); June-Jae Yoo, Seoul (KR)

(73) Assignee: Korea Electronics Technology Institute, Kyunggi-Do (JP)

( * ) Notice: Subject to any disclaimer, the term of this patent is extended or adjusted under 35 U.S.C. 154(b) by 631 days.

This patent is subject to a terminal disclaimer.

(21) Appl. No.: 10/976,900

(22) Filed: Nov. 1, 2004

(65) Prior Publication Data
US 2005/0254561 A1 Nov. 17, 2005

(30) Foreign Application Priority Data
May 12, 2004 (KR) ...................... 10-2004-0033328

(51) Int. Cl.
*H04B 1/38* (2006.01)
(52) U.S. Cl. .................. 375/219; 370/329; 370/437; 370/318; 370/332; 370/334; 370/485; 370/481; 370/341; 370/349; 455/450; 455/464; 455/509; 455/513
(58) Field of Classification Search .............. 375/219, 375/222, 295, 316; 370/329, 437, 318, 332, 370/334, 485, 481, 341, 349; 455/450, 464, 455/509, 513
See application file for complete search history.

(56) References Cited

U.S. PATENT DOCUMENTS

| | | | | |
|---|---|---|---|---|
| 4,736,453 A | * | 4/1988 | Schloemer | .................. 455/450 |
| 5,887,020 A | * | 3/1999 | Smith et al. | ................. 375/130 |
| 6,105,690 A | * | 8/2000 | Biglin et al. | .................. 175/48 |
| 6,658,237 B1 | | 12/2003 | Rozenblit et al. | |
| 6,704,549 B1 | | 3/2004 | Sorrells et al. | |
| 2001/0014594 A1 | * | 8/2001 | Khlat et al. | ................. 455/303 |
| 2002/0186715 A1 | * | 12/2002 | Mestdagh | ................... 370/480 |

\* cited by examiner

*Primary Examiner*—Mohammad H Ghayour
*Assistant Examiner*—Leila Malek
(74) *Attorney, Agent, or Firm*—Edell, Shapiro & Finnan, LLC

(57) ABSTRACT

Disclosed herein is a multi-standard transceiver for supporting a plurality of time division deplexing wireless communication standards. The multi-standard transceiver has a Multi-Mode Modem (MMM), a frequency synthesizing unit, a transmission unit, a reception unit and a transmission/reception switch. The MMM selects a transmission standard and a transmission channel and performs digital modulation/demodulation. The frequency synthesizing unit variably adjusts a carrier frequency. The transmission unit receives a digital modulated signal, low-pass-filters the digital modulated signal with a bandwidth thereof variably adjusted according to the selected transmission standard, and up-converts the filtered digital modulated signal into an RF modulated signal. The reception unit down-converts the RF modulated signal, low-pass-filters the down-converted RF modulated signal with a bandwidth thereof being variably adjusted according to the selected transmission standard, and converts the filtered, down-converted RF modulated signal into a digital modulated signal.

20 Claims, 6 Drawing Sheets

FIG. 1    PRIOR ART

MULTI-STANDARD TRANSCEIVER FOR SUPPORTING WIRELESS COMMUNICATIONS IN 2.3-2.4 GHZ BAND

RELATED APPLICATIONS

The present disclosure relates to subject matter contained in priority Korean Application No. 10-2004-0033328, filed on 12 May 2004, which is herein expressly incorporated by reference in its entirety.

BACKGROUND OF THE INVENTION

1. Field of the Invention

The present invention relates generally to a multi-standard transceiver for supporting a plurality of time division duplexing wireless communication standards and, more particularly, a multi-standard transceiver for supporting IEEE 802.11b, IEEE 802.11g and High-speed Portable Internet in 2.3-2.4 GHz band.

2. Description of the Related Art

Recently, various communication standards are emerging to meet users' demands for various wireless communication services. In particular, as the use of the wired Internet is popularized, a variety of Wireless Local Area Network (WLAN) standards, such as IEEE 802.11b and IEEE 802.11g in 2.4 GHz band and IEEE 802.11a in 5 GHz band, are established to support broadband Internet access even in a wireless communication environment. A lot of users are already using WLAN service.

However, the above-described WLAN standards do not adequately guarantee users' mobility, so that users' demands for new wireless mobile Internet service are increasing. Correspondingly, in Korea, High-Speed Portable Internet (Hpi) in 2.3 GHz band has been proposed and will be established soon as a standard, which is based on Time Division Duplexing (TDD)/Orthogonal Frequency Division Multiplexing (OFDM). In regard to international standardization, the task group of IEEE 802.11e is standardizing portable Internet service that can guarantee mobility.

Meanwhile, even though the High-speed Portable Internet (HPi) service is launched, the HPi service may start from local areas. Accordingly, a problem is anticipated in that the users of the areas where HPi is not supported cannot help using the existing WLAN service. Accordingly, wireless Internet service can be used without inconvenience only when HPi Access Terminals (HPi-ATs) support both the HPi standard and the existing WLAN standards. This type of problem was already experienced when the cellular mobile communication (AMPS) was upgraded to the digital cellular mobile communication (IS-95).

FIG. 1 is a block diagram of a typical wireless communication transceiver. As shown in this drawing, the typical wireless communication transceiver is composed of a BaseBand (BB) modem 100 that performs modulation and demodulation using modulation and demodulation schemes defined by the physical layer specifications of each standard, a Radio Frequency (RF) front-end block (or RF/analog block) 105 that converts a digital modulated signal, output from the modem 100, into an RF modulated signal and converts an RF modulated signal, received from an antenna 110, into a digital modulated signal, and the antenna 110 that wirelessly transmits and receives the RF modulated signals.

In the transmission operation of the RF front-end block 105, a Digital-Analog Converter (DAC) 115 converts a signal, digitally modulated by the modem 100, into an BB analog modulated signal according to bit resolution corresponding to a selected standard, and a Direct Current (DC) component correction and Low-Pass Filter (LPF) unit 120 removes a DC offset from the analog modulated signal output from the DAC 115, and low-pass-filters the analog modulated signal to a bandwidth corresponding to a selected transmission standard.

Frequency up converters 125 and 130 up-convert the In-phase (I) component of the BB analog modulated signal, output from the DC component correction and LPF unit 120, and the Quadrature (Q) component thereof into an RF band corresponding to the selected transmission standard, and output I and Q RF modulated signal components, respectively. The I and Q RF modulated signal components are combined together by an adder 135, and the RF modulated signal output from the adder 135, is amplified by a power amplifier 140.

The RF modulated signal is output to the antenna 110 at transmission periods based on TDD through a transmission/reception switch (T/R SW) 145. In this case, the RF modulated signal passes through a Band-Pass Filter (BPF) 150 to allow an out-of-band spurious signal to be removed therefrom.

In the reception operation of the RF front-end block 105, the RF modulated signal, input from the antenna 110, is freed from an out-of-band spurious signal by the BPF 150, and is input to the transmission/reception switch 145.

The transmission/reception switch 145 outputs the RF modulated signal, output from the power amplifier 140 of a transmission side, toward the antenna 110 through the BPF 150 at the intervals of TDD transmission, or inputs the RF modulated signal, received from the antenna 110 and passed through the BPF 150, to the Low Noise Amplifier (LNA) 170 of a reception side at the intervals of TDD reception.

The LNA 170 low-noise-amplifies the RF modulated signal, output from the T/R SW 145, in an RF frequency band. The low-noise-amplified signal is down-converted into baseband (BB) modulated signals by frequency down conversion mixers 175 and 180 with respect to the I and Q components thereof. A low-pass filter and programmable gain amplifier 185 low-pass-filters the BB modulated signal to a channel bandwidth corresponding to the transmission standard and performs BB amplification with respect to the I and Q components.

An Analog-Digital Converter (ADC) 190 converts the above-described BB modulated signal into a digital modulated signal according to a bit resolution corresponding to the selected transmission standard, and outputs the digital modulated signal to the BB modem 100.

In regard to the generation of a carrier, a programmable divider 160 divides a local oscillation frequency generated by an oscillator 155, and a frequency synthesizer 165 generates a carrier frequency using a frequency output from the programmable divider 160.

In the above-described single standard transceiver, it is possible to design a multi-standard transceiver by combining together transceiver structures for supporting respective standards in parallel. However, in this case, it is difficult to meet costs, area and power consumption requirements demanded by a variety of applications. That is, the method of merely integrating a plurality of single standard transceivers into a system causes the increase of the implementation size and significant power consumption attributable to the duplication of functional blocks, so that it is not easy in terms of product competiveness to adopt the method.

SUMMARY OF THE INVENTION

Accordingly, the present invention has been made keeping in mind the above problems occurring in the prior art, and an object of the present invention is to provide a multi-standard transceiver for supporting the physical layers (PHY) of IEEE 802.11b, IEEE 802.11g and HPi that are the principal standards of a WLAN and the portable Internet in 2.3-2.4 GHz band, in which similar functional blocks are maximally shared, so that the implementation size and power consumption thereof are reduced, thus decreasing the unit cost thereof in mass production and facilitating the adoption thereof to mobile terminals.

In order to accomplish the above object, in accordance with a first aspect of the present invention, the present invention provides a multi-standard transceiver for supporting a plurality of TDD wireless communication standards, including a Multi-Mode Modem (MMM) for selecting a transmission standard and a transmission channel from the plurality of standards, and performing digital modulation/demodulation in a BB according to the selected transmission standard; a frequency synthesizing unit for variably adjusting a carrier frequency according to the transmission standard selected by the MMM, and outputting the carrier frequency; a transmission unit for receiving a digital modulated signal output from the MMM, low-pass-filtering the digital modulated signal with a bandwidth thereof variably adjusted according to the selected transmission standard, and up-converting the filtered digital modulated signal into an RF modulated signal corresponding to the selected transmission channel; a reception unit for down-converting the RF modulated signal using the carrier frequency, low-pass-filtering the down-converted RF modulated signal with a bandwidth thereof being variably adjusted according to the selected transmission standard, converting the filtered, down-converted RF modulated signal into a digital modulated signal; and a transmission/reception switch for outputting the RF modulated signal, input from the transmission unit, to an antenna, or outputting the RF modulated signal, received from the antenna, to the reception unit.

In accordance with a second aspect of the present invention, the present invention provides a multi-mode RF frequency front-end device for supporting a plurality of TDD wireless communication standards, and performing wireless modulation/demodulation according to transmission standard and channel selected from the plurality of TDD wireless communication standards, including a frequency synthesizing unit for variably adjusting a carrier frequency according to the selected transmission channel, and outputting the carrier frequency; a transmission unit for receiving a digital modulated signal, low-pass-filtering the digital modulated signal with a bandwidth thereof variably adjusted according to the selected transmission standard, and up-converting the filtered digital modulated signal into a Radio Frequency (RF) modulated signal corresponding to the selected transmission channel; a reception unit for down-converting the RF modulated signal using the carrier frequency, low-pass-filtering the down-converted RF modulated signal with a bandwidth thereof being variably adjusted according to the selected transmission standard, converting the filtered, down-converted RF modulated signal into a digital modulated signal; and a transmission/reception switch for outputting the RF modulated signal, input from the transmission unit, to an antenna, or outputting the RF modulated signal, received from the antenna, to the reception unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
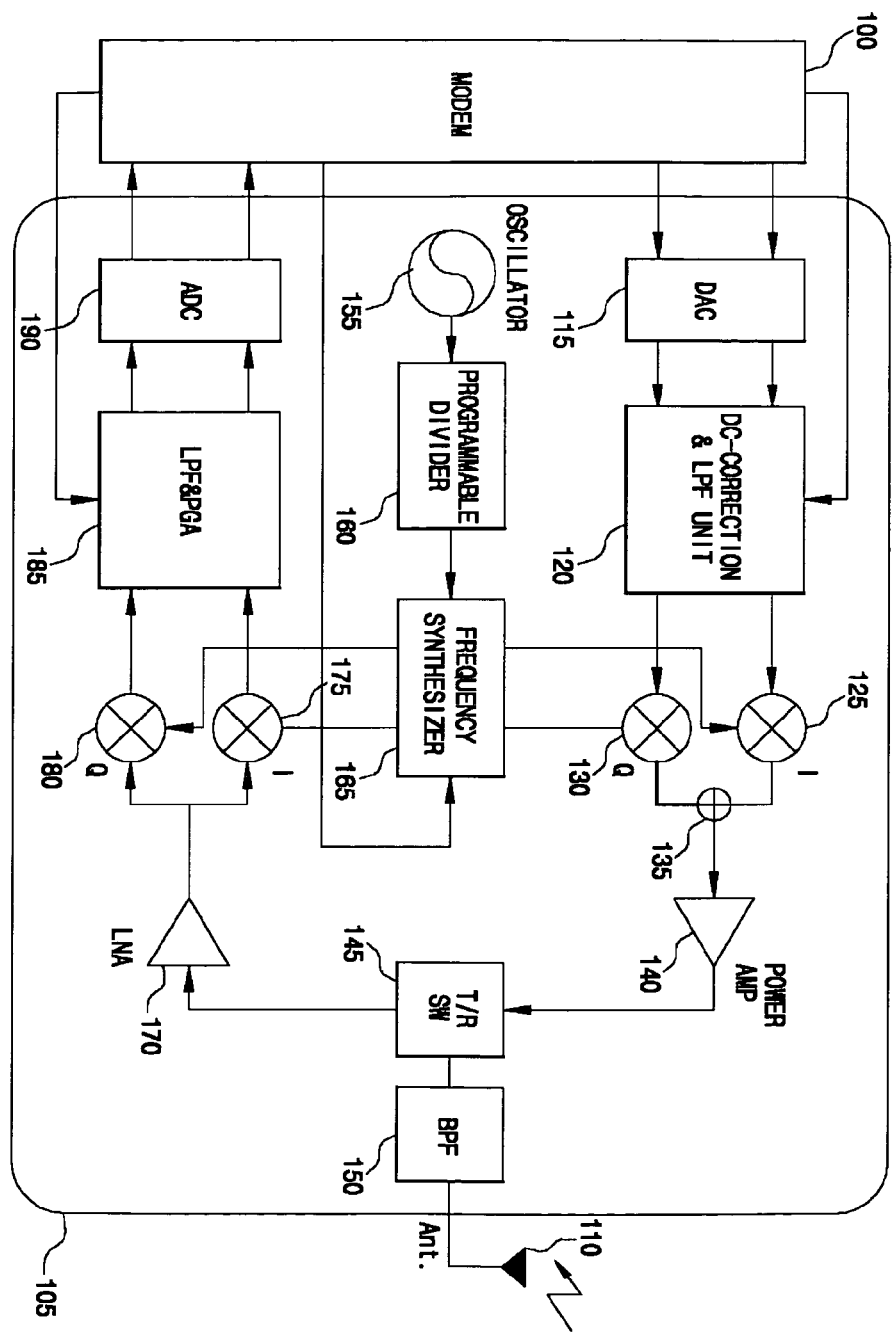
FIG. 1 is a block diagram of a conventional wireless transceiver for supporting a single standard.

Reference now should be made to the drawings, in which the same reference numerals are used throughout the different drawings to designate the same or similar components.

Figure 2:
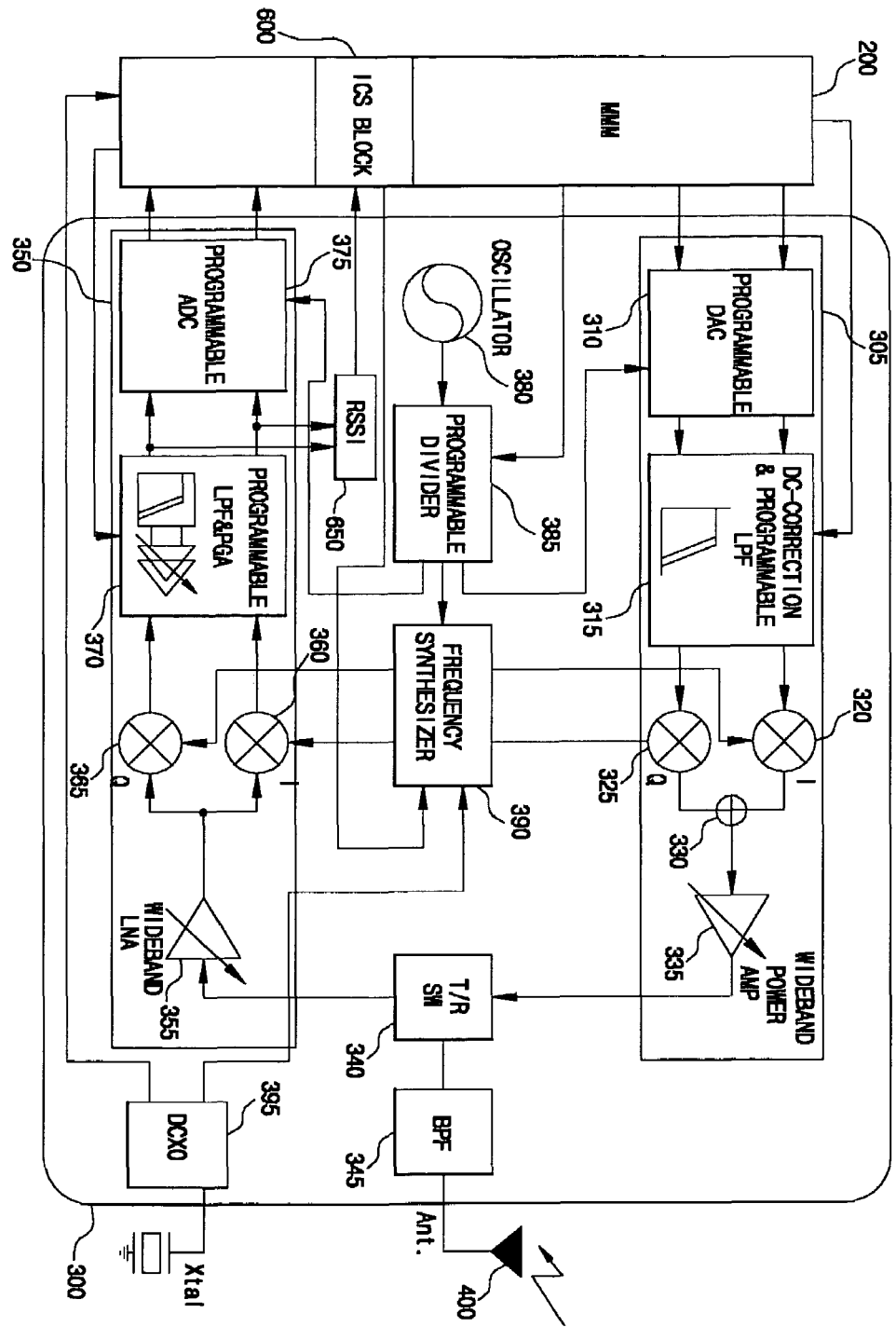
FIG. 2 is a block diagram of a wireless transceiver for supporting multi-standards in accordance with a preferred embodiment of the present invention.

FIG. 2 is a block diagram of a wireless transceiver for supporting a plurality of standards in accordance with a preferred embodiment of the present invention. The wireless transceiver includes a Multi-Mode Modem (MMM) 200, and a Multi-Mode RF/Analog stage (MMRA) 300 that is a multi-mode RF front-end block.

The MMM 200 supports IEEE 802.11b, IEEE 802.11g and HPi that are TDD wireless communication standards in 2.3-2.4 GHz band. The MMM 200 selects one from the plurality of communication standards, and performs digital modulation/demodulation in baseband. That is, the MMM 200 performs the OFDM modulation/demodulation of HPi using 2.3 GHz band, or the Quadrature Phase Shift Keying (QPSK) and/or OFDM modulation/demodulation of IEEE 802.11b and IEEE 802.11g using 2.4 GHz ISM band according to the selected transmission standard.

The MMM 200 may include an Intelligent Channel Selection (ICS) block 600 that selects a channel, which is least influenced by interference, from channels corresponding to the selected transmission standard. The ICS block 600 may select a transmission channel based on the relationship between the BB received signal strengths and frequency offsets. A detailed description of the ICS block 600 will be made with reference to FIGS. 4 to 7 later.

Meanwhile, the principal characteristic of the present invention is the sharing of the function blocks of the RF front-end block (that is, the MMRA) to support the physical layers of HPi in 2.3 GHz band and IEEE 802.11b and IEEE 802.11g in 2.4 GHz band. For example, even though an option is added to the BB modulation schemes of HPi, a function can be added to the MMM of the present invention to support the option.

The MMRA 300 is an RF front-end block, and may be divided into a transmission unit 305, a reception unit 350 and a frequency synthesizing unit 380, 385, 390 and 395. The transmission unit 305 and the reception unit 350 use a direct conversion or zero-IF scheme, and can support the above-described various standards using amplifiers 335 and 355 that support wideband processing, programmable DAC and ADC 310 and 375 that can variably adjust bit resolution, and programmable LPFs 315 and 370 that can variably adjust pass-bandwidths, respectively. The frequency synthesizing unit variably generates carrier frequencies corresponding to the transmission standards and transmission channels using a programmable divider 385 and a Digitally Compensated Crystal Oscillator (DCXO) 395.

In detail, in the transmission unit 305 of the MMRA 300, the programmable DAC 310 variably adjusts or selects bit resolution to correspond to the transmission standard, and converts a digital modulated signal from the MMM 200 into a BB analog modulated signal. HPi has 10-bit resolution, and WLAN has 6-8 bit resolution.

A DC-correction and programmable LPF 315 corrects the DC offset of the analog modulated signal output from the programmable DAC 310, and low-pass-filters the analog modulated signal with the pass-bandwidth thereof being variably adjusted to the channel bandwidth of the selected standard (10 MHz for HPi, and 22 MHz for WLAN), thus generating a spectral waveform corresponding to the selected standard.

The frequency up converters 320 and 325 up-convert the I and Q components of the analog modulated signal, output from the DC-correction and programmable LPF 315, into RF modulated signals corresponding to the selected transmission standard and channel using the carrier frequency signal fed from the frequency synthesizer. That is, if HPI is selected, the analog modulated signal is frequency-converted to correspond to a transmission channel of 2.3 GHz, and if IEEE 820.11b or IEEE 820.11g is selected, the analog modulated signal is frequency-converted to correspond to a transmission channel of 2.4 GHz ISM band. The RF modulated signals are added in an adder 330 with respect to I and Q components.

The wideband power amplifier 335, capable of performing power control, amplifies the output of the RF modulated signal, and has a wideband characteristic of amplifying a HPi RF modulated signal of 2.3 GHz and a WLAN RF modulated signal of 2.4 GHz.

The amplified RF modulated signal is time-division duplexed through a transmission/reception switch (T/R SW) 340, then is output toward an antenna 400 at predetermined transmission periods, and may be passed through a BPF 345 to allow an out-of-band spurious signal to be removed therefrom.

The transmission/reception switch 340 inputs the RF modulated signal, received from the antenna 400 and passed through the BPF 345, to the reception unit 350 at reception periods allocated according to TDD.

The reception unit 350 of the MMRA 300 is described below.

The wideband LNA 355 is capable of performing power control, and low-noise-amplifies the RF modulated signal, output from the transmission/reception switch 340, in an RF band. That is, the wideband LNA 355 has a wideband characteristic of amplifying an HPi RF modulated signal of 2.3 GHz and a WLAN RF modulated signal of 2.4 GHz according to the selected transmission standard.

Frequency down conversion mixers 360 and 365 convert the I and Q components of the RF modulated signal, low-noise-amplified by the wideband LNA 355, into BB analog modulated signals using the carrier frequency signals fed from the frequency synthesizing unit.

A programmable LPF and Programmable Gain Amplifier (LPF&PGA) 370 variably adjusts a channel bandwidth according to the selected transmission standard (for example, 10 MHz for HPi, and 22 MHz for WLAN), low-pass-filters the down-converted I and Q components of the analog modulated signal into the variably adjusted bandwidth, and gain-amplifies the filtered analog modulated signal, thus performing an Analog-mode Channel Selection (ACS) function.

The analog modulated signal output from the programmable LPF and PGA 370 may be output to a Received Signal Strength Indicator (RSSI) 650 to generate a received signal strength indication signal indicating the strength of each reception channel. The received signal strength indication signal may be used in the ICS 600.

The programmable ADC 375 variably selects bit resolution suitable for the selected transmission standard (for example, 8-bit resolution for HPi, and 6-bit resolution for WLAN), and converts the analog modulated signal, output from the programmable LPF and PGA 370, into a digital modulated signal. The digital modulated signal output from the programmable ADC 375 is output to the MMM 200.

In regard to the channel selection, although the programmable LPF and PGA 370 has been described as performing the ACS function, Digital-mode Channel Selection (DCS) and Mixed-mode Channel Selection (MCS) may be performed instead. In case of using DCS or MCS, a Signal-to-Noise Ratio (SNR) required by the programmable ADC 375 is higher than that for ACS due to the accommodation of a strong blocker, and it is necessary to add a digital filter to the output terminal of the programmable ADC 375. The constructions of the programmable ADC 375 for supporting the DCS and the MCS are described in detail with reference to FIGS. 3a to 3c.

In the frequency synthesizing unit 380, 385, 390 and 395, a Voltage Controlled Oscillator (VCO) or oscillator 380 generates a local oscillation frequency signal of 5 GHz, and a programmable divider 385 variably divides the local oscillation frequency of 5 GHz to be suitable for the selected transmission standard. That is, the frequency output from the programmable divider 385 can be varied to be suitable for the transmission standard selected by the MMM 200. Accordingly, the programmable DAC 310 and the programmable ADC 375 may be constructed to ascertain the selected transmission standard from the programmable divider 385, and perform conversion.

The frequency synthesizer 390 is formed of an integer Phase Looked Loop (PLL) or fractional PLL, and variably generates a frequency corresponding to the selected transmission channel using a frequency output from the programmable divider 385 and a reference frequency output from a Digitally Compensated Crystal Oscillator (DCXO) 395. The DCXO 395 can create a reference frequency suitable for a transmission channel, for example, 10 MHz, 22 MHz or multiples thereof, in accordance with the transmission standard selected by the MMM 200. The frequency synthesizer 390 can change the frequency, output from the programmable divider 385, to a transmission frequency suitable for the transmission channel using the reference frequency in accordance with channel selection information provided from the MMM 200, and fixes the transmission frequency.

The transmission frequency signal generated by the frequency synthesizer 390 are input to the frequency up converters 320 and 325 and the frequency down converters 360 and 365 while being divided into I and Q components, and are used to perform frequency up conversion and frequency down conversion.

Figure 3A:
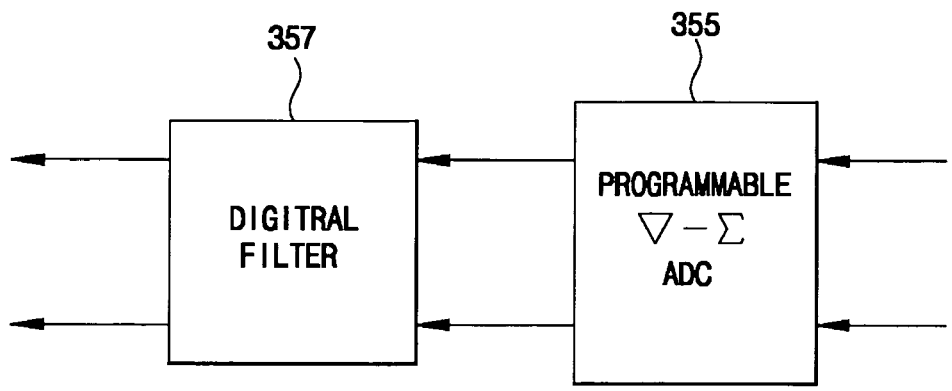
FIGS. 3a to 3c are diagrams showing the detailed constructions of a programmable ADC in accordance with preferred embodiments of the present invention.
Figure 3B:
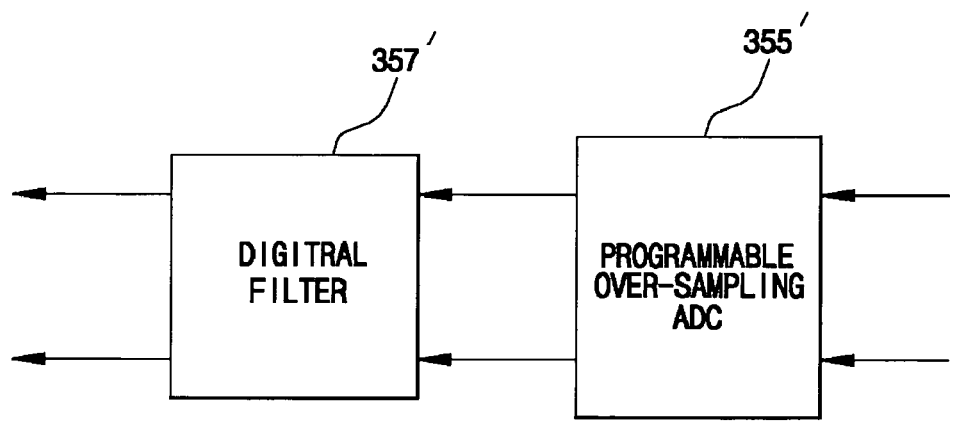
Figure 3C:
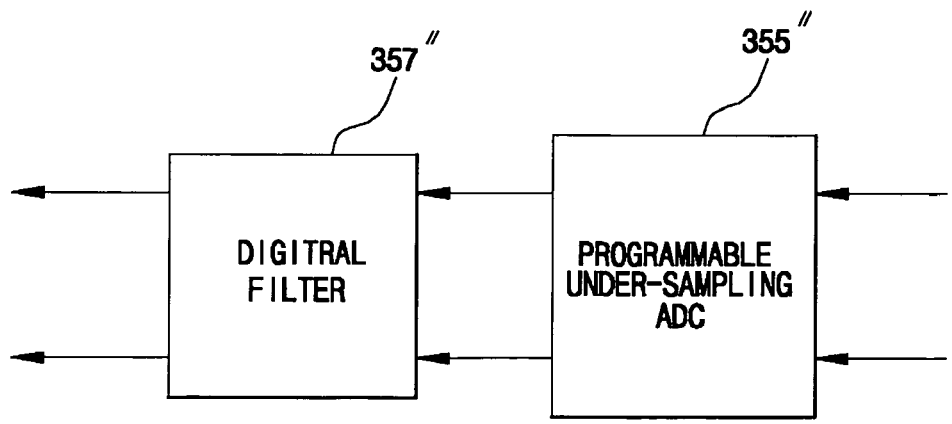

FIGS. 3a to 3c are diagrams showing the detailed constructions of the programmable ADC 355 of FIG. 2 in accordance with preferred embodiments of the present invention.

With reference to FIG. 3a, the programmable ADC 355 of FIG. 2 may be formed of a programmable sigma-delta (Σ-∇) ADC 355, and may additionally include a digital filter 357. As described above, the programmable Σ-∇ ADC 355 must have a high SNR, and the digital filter 357 performs digital channel filtering on the parts that have not been channel filtered by the programmable LPF and PGA 370.

FIG. 3b shows the general case where a programmable over-sampling ADC 355' is used. The ACS is actually performed by the programmable LPF and PGA 370 of FIG. 2. Consequently, the over-sampling ADC 355' has a relatively low SNR, and a digital filter 357' may be deleted.

FIG. 3c shows the case where a programmable under-sampling ADC 36" is used. The programmable under-sampling ADC 355" must have a high SNR like the programmable Σ-∇ ADC 355, and a digital filter 357" is additionally included to perform channel filtering on the parts that are not analog channel filtered. In the meantime, the construction of FIG. 3c has an advantage in that it can be used as a digital IF construction other than the construction of a direct-conversion receiver.

Figure 4:
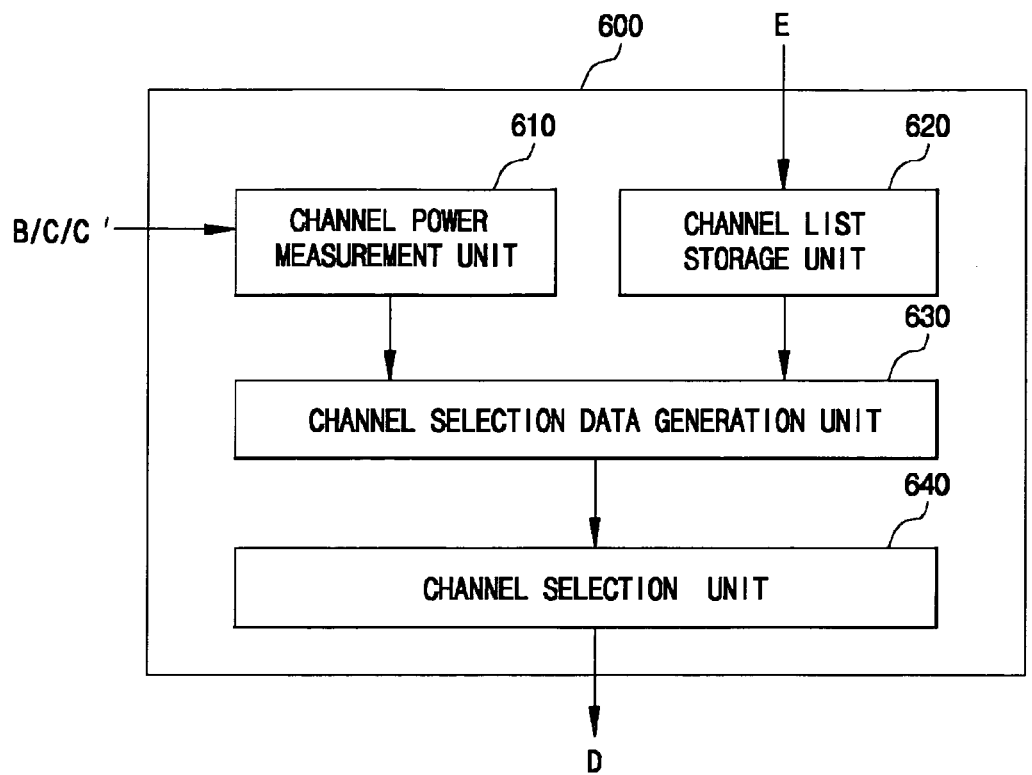
FIG. 4 is a block diagram of an intelligent channel selection block in accordance with a preferred embodiment of the present invention.

FIG. 4 is a block diagram showing an intelligent channel selection apparatus 600 in accordance with an embodiment of the present invention. As shown in FIG. 4, the intelligent channel selection apparatus 600 of the present invention includes a channel power measurement unit 610 measuring received signal channel power (strength) through the use of at least one of the data "B," "C" and "C'" input from the MMRA 300 of FIG. 2, and storing the measured channel power as signal channel power data, a channel list storage unit 620 arranging available channels through the use of data "E" input from the demodulation unit of the MMM 200, a channel data generation unit 630 generating data, which will be used to select a channel, based on the signal channel power data and the frequency offsets of channels of a channel list, and a channel selection unit 640 selecting the highest priority channel from the channels of the channel list based on the data for channel selection, and transmitting the data for channel selection to the frequency synthesizer 390 of the MMRA 300 as an output D. Meanwhile, the Received Signal Strength Indicator (RSSI) 650 of FIG. 2 may be substituted, wholly or in part, for the channel power measurement unit 610.

In more detail, the channel power measurement unit 610 generates an RSSI signal indicating received channel power for each channel, and stores the RSSI signal as signal channel power data. That is, the RSSI signal is generated for a channel signal received from the antenna, and is provided to the channel selection data generation unit 630.

The channel power measurement unit 610 can generate the RSSI signal in various ways. For example, an analog RSSI signal is generated by processing an input analog data from the programmable LPF and PGA 370 of FIG. 2, the analog RSSI signal is converted into a digital RSSI signal by A/D converter, and the digital RSSI signal is provided to the channel selection data generation unit 630. Alternatively, the input analog data is converted into digital data by A/D converter, a digital RSSI signal is generated by processing the digital data through a digital RSSI processing unit, and the digital RSSI signal is provided to the channel selection data generation unit 630.

The channel list storage unit 620 generates a channel list by arranging all channels available on a network to which the transceiver belongs, and stores the channel list. For example, all the channels unoccupied on the network layer of the demodulation unit (not shown) of the MMM and the cell network to which the transceiver belongs are arranged and stored in a channel list.

The channel selection data generation unit 630 generates data for channel selection on the basis of signal channel power data measured in the channel power measurement unit 610 and the frequency offsets of channels of the channel list generated in the channel list storage unit 620. The data for channel selection may be various. In the embodiment of the present invention, the data for channel selection may be generated using, for example, Equation 1.

$$\omega_1 = \alpha_1(p_1-p_1) + \alpha_2(p_1-p_2) + \alpha_3(p_1-p_3) + \ldots + \alpha_k(p_1-p_k)$$

$$\omega_2 = \alpha_2(p_2-p_1) + \alpha_1(p_2-p_2) + \alpha_2(p_2-p_3) + \ldots + \alpha_{k-1}(p_2-p_k)$$

$$\omega_3 = \alpha_3(p_3 \times p_1) + \alpha_2(p_3 \times p_2) + \alpha_1(p_3 \times p_3) + \ldots + \alpha_{k-2}(p_3 \times p_k)$$

$$\ldots$$

$$\omega_{k-1} = \alpha_{k-1}(p_{k-1}-p_1) + \alpha_{k-2}(p_{k-1}-p_2) + \alpha_{k-3}(p_{k-1}-p_3) + \ldots + \alpha_2(p_{k-1}-p_k)$$

$$\omega_k = \alpha_k(p_k-p_1) + \alpha_{k-1}(p_k-p_2) + \alpha_{k-2}(p_k-p_3) + \ldots + \alpha_1(p_k-p_k) \quad (1)$$

In Equation 1, $\omega_k$ is the sum of the differences between own received signal channel power and the power of interferers, including frequency offset parameter contribution with respect to each channel number. Furthermore, $p_k$ represents received signal channel power. $\alpha_k$ is a weighting parameter, including a frequency offset factor, with respect to each channel number. $\alpha_k$ is expressed by $\rho(k-1)f_{ch}$ where k is a channel number, $\rho$ is a kind of proportional coefficient normalized with respect to the contribution of a frequency offset and the contribution of received signal channel power, and $f_{ch}$ is the frequency of a corresponding channel. Substantially, $\rho$ can be expressed by a function of interferer attenuation related to the selectivity of the receiver.

The following Equation 2 is obtained by converting the data of Equation 1 into a Channel Selection Assignment Matrix (CSAM) $W_k$.

$$W_k = \begin{bmatrix} 0 & \alpha_2(p_1-p_2) & \alpha_3(p_1-p_3) & \cdots & \alpha_k(p_1-p_k) \\ \alpha_2(p_2-p_1) & 0 & \alpha_2(p_2-p_3) & \cdots & \alpha_{k-1}(p_2-p_k) \\ \alpha_3(p_3-p_1) & \alpha_2(p_3-p_2) & 0 & \cdots & \alpha_{k-2}(p_3-p_k) \\ & & \cdots & & \\ \alpha_{k-1}(p_{k-1}-p_1) & \alpha_{k-2}(p_{k-1}-p_2) & \alpha_{k-3}(p_{k-1}-p_3) & \cdots & \alpha_2(p_{k-1}-p_k) \\ \alpha_k(p_k-p_1) & \alpha_{k-1}(p_k-p_2) & \alpha_{k-2}(p_k-p_3) & \cdots & 0 \end{bmatrix} \quad (2)$$

When the data for channel selection, for example, the CSAM data $W_k$, is generated as described above, the channel selection unit 380 selects a highest priority channel from the channels of the channel list based on the data for channel selection. A channel is not selected simply using signal channel power, for example, an RSSI signal, but is selected based on the CSAM data with frequency offsets taken into consideration. Information on the channel selected as described above is transmitted to the frequency synthesizer 390 and/or DCXO 395 of the MMRA 300 and allows a corresponding channel to be used.

Figure 5:
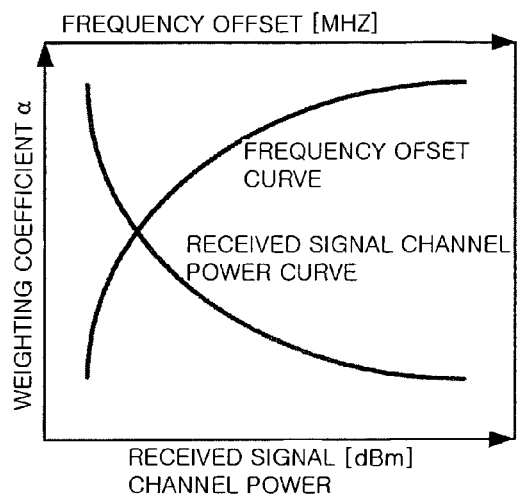
FIG. 5 is a graph showing the variations of a weighting coefficient α according to frequency offsets and received signal channel powers in a typical communication system.

FIG. 5 is a graph showing the variations of a weighting coefficient α according to frequency offsets and received signal channel power in general communication systems. As shown in FIG. 5, the weighting coefficient α increases as the frequency offset increases, while the weighting coefficient α decreases as the received channel power increases. In brief, it can be known that the effect of the frequency offset is directly proportional to the effect of the received channel power.

Figure 6:
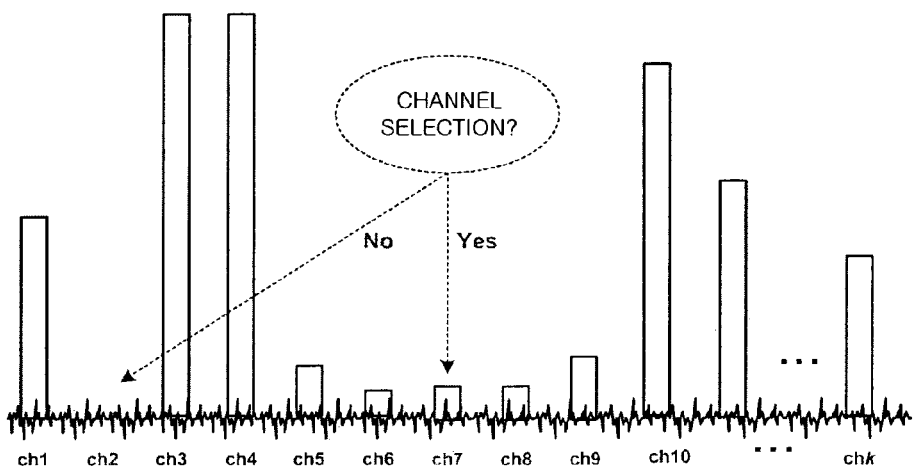
FIG. 6 is a graph showing signal channel powers for channel selection in a channel selection and allocation situation.

FIG. 6 is a graph showing signal channel power for channel selection in a channel selection/assignment circumstance. As shown in FIG. 6, when signal channel power is represented for channels available to the mobile station MSx, it can be known that signal channel power is lowest for channel No. 2. For example, when the DCS scheme disclosed in Razavilar et al.'s patent application is used, the channel No. 2 having the lowest channel power is assigned to the mobile station MSx. However, the DCS scheme disclosed in Razavilar et al.'s patent application does not consider frequency offsets at all. In particular, when the influence of the surrounding interferers is considered, the channel selection increases the minimum detectable signal level of the receiver and power consumption due to the IMD effects caused by stronger interferers in surrounding channels and reciprocal mixing effects. Of the channels shown in FIG. 6, channel No. 7 ch7 selected according to the intelligent channel selection of the present invention, for example, based on a calculated CSAM, with both frequency offsets and channel power taken into consideration, is assigned to the mobile station MSx as a communication channel.

Figure 7:
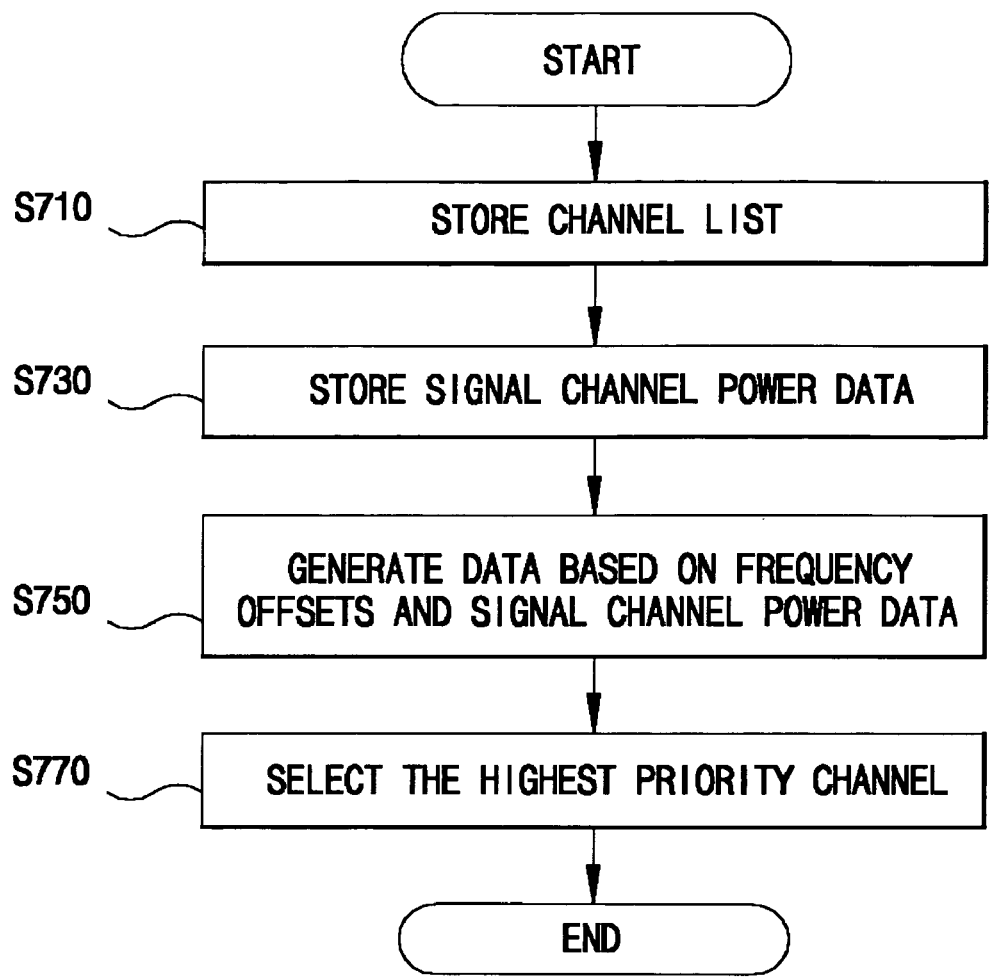
FIG. 7 is a flowchart showing an intelligent channel selection method in accordance with a preferred embodiment of the present invention.

FIG. 7 is a flowchart showing an intelligent channel selection method in accordance with the present invention.

A plurality of available channels are arranged and stored in a channel list at step S710. As described above, for example, all the channels unoccupied on the network layer of the demodulation unit (not shown) of the BB module 160 and the cell network to which the receiver 100 belongs are arranged, and stored in a channel list.

The received signal channel power is measured for the plurality of available channels and stored as signal channel power data at step S730. At this step, for example, an RSSI signal indicating received channel power is generated for each channel, and is stored as signal channel power data.

Data for channel selection is generated based on the signal channel power data and the frequency offsets of the channels of the channel list at step S750. This step generates, for example, the above-described CSAM data.

Thereafter, the highest priority channel is selected from the channels of the channel list based on the data for channel selection at step S770. The priority may be set to allow a channel having the highest CSAM value to be selected.

With the above-described steps, the intelligent channel selection method of the present invention can be implemented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As described above, the present invention provides the multi-standard transceiver for supporting HPi, IEEE 802.11b and IEEE 802.11g in 2.3-2.4 GHz band, in which similar function blocks are shared and, in particular, all the function blocks of the MMRA are shared among the plurality of standards, so that the implementation size and power consumption thereof can be reduced and the unit cost thereof in mass production can be decreased, thus being easily adopted in a mobile terminal.

What is claimed is:

1. A multi-standard transceiver for supporting a plurality of Time Division Duplexing (TDD) wireless communication standards, comprising:
   a Multi-Mode-modem (MMM) for selecting a transmission standard from the plurality of standards, and performing digital modulation/demodulation in a Base-Band (BB) according to the selected transmission standard, and selecting a transmission channel;
   a frequency synthesizing unit for variably adjusting a carrier frequency according to the transmission channel selected by the MMM, and outputting the carrier frequency;
   a transmission unit for receiving a digital modulated signal output from the MMM, converting the digital modulated signal into a BB analog modulated signal, low-pass-filtering the analog modulated signal with a bandwidth thereof variably adjusted according to the selected transmission standard, and up-converting the analog modulated signal into a Radio frequency (RF) modulated signal corresponding to the selected transmission channel, using the carrier frequency;
   a reception unit for down-converting a received RF modulated signal to a BB analog modulated signal using the carrier frequency, low-pass-filtering the analog modulated signal with a bandwidth thereof being variably adjusted according to the selected transmission standard, and converting the filtered, analog modulated signal into a digital modulated signal;
   a transmission/reception switch outputting the RF modulated signal, input from the transmission unit, to an antenna, or outputting the RF modulated signal, received from the antenna, to the reception unit; and
   an intelligent channel selection block for selecting a transmission channel based on received signal strengths and frequency offsets of channels;
   wherein the intelligent channel selection block comprises:
   a channel power measurement unit measuring received signal channel power on a network to which the transceiver belongs, and storing the received signal channel power as channel power data;
   a channel list storage unit arranging all channels available on a network to which the transceiver belongs, and storing the channel list;
   a channel selection data generation unit generating channel selection assign matrix (CSAM) which comprises of a sum of the differences between given received signal channel power and the power of interferers, including frequency offset parameter contribution with respect to each channel number for channel selection based on the signal channel power data and frequency offsets of channels in the channel list; and
   a channel selection unit selecting a highest priority channel from the channels of the channel list based on the channel selection assign matrix (CSAM) for channel selection.

2. The multi-standard transceiver as set forth in claim 1, wherein the plurality of wireless communication standards include at least one of IEEE 802.11b and IEEE 802.11g in 2.4 GHz band, and a portable Internet standard in 2.3 GHz band.

3. The multi-standard transceiver as set forth in claim 1, wherein the portable Internet standard in 2.3 GHz band is High-speed Portable Internet (HPi).

4. The multi-standard transceiver as set forth in claim 1, wherein the transmission unit comprises:
- a programmable Digital-Analog Converter (DAC) for converting the digital modulated signal, generated by the MMM, into the analog modulated signal with bit resolution thereof being variably adjusted according to the transmission standard;
- a waveform shaper for low-pass-filtering the analog modulated signal, output from the programmable DAC, with a bandwidth thereof being variably adjusted according the selected transmission standard;
- a frequency up converter for up-converting the analog modulated signal, output from the waveform shaper, into an RF modulated signal corresponding to the selected transmission channel using the carrier frequency output from the frequency synthesizer; and
- a wideband power amplifier for amplifying the up-converted RF modulated signal.

5. The multi-standard transceiver as set forth in claim 4, further comprising a Direct Current (DC) corrector for correcting a DC component of the analog modulated signal output from the programmable DAC.

6. The multi-standard transceiver as set forth in claim 1, wherein the reception unit comprises:
- a wideband low noise amplifier for low-noise-amplifying the RF modulated signal output from the transmission/reception switch;
- a frequency down converter for down-converting the RF modulated signal, output from the wideband low noise amplifier, into the analog modulated signal using the carrier frequency output from the frequency synthesizer;
- an analog channel selector for low-pass-filtering the analog modulated signal, output from the frequency down converter, with a bandwidth being variably adjusted according to the selected transmission standard; and
- a programmable Analog-Digital Converter (ADC) for converting the analog modulated signal, output from the analog channel selector, into the digital modulated signal with bit resolution thereof being variably adjusted in accordance with the selected transmission standard.

7. The multi-standard transceiver as set forth in claim 6, wherein the analog channel selector comprises:
- a programmable low-pass filter for low-pass-filtering the down-converted, analog modulated signal with a bandwidth thereof being variably adjusted to the selected transmission standard; and
- a programmable amplifier for variably amplifying the analog modulated signal, filtered by the programmable low-pass filter, according to the selected transmission standard.

8. The multi-standard transceiver as set forth in claim 6, wherein the reception unit further comprises a received signal intensity indicator for calculating a strength of the analog modulated signal filtered by the analog channel selector and providing the calculated strength of the filtered analog modulated signal to the channel selector.

9. The multi-standard transceiver as set forth in claim 6, wherein the programmable ADC comprises:
- a sigma-delta ADC for converting the analog modulated signal filtered by the analog channel selector, into the digital modulated signal; and
- a digital filter for filtering the digital modulated signal, output from the sigma-delta ADC, into a channel bandwidth corresponding to the selected transmission standard.

10. The multi-standard transceiver as set forth in claim 6, wherein the programmable ADC comprises:
- a programmable over-sampling analog-digital converter for over-sampling and converting the analog modulated signal, filtered by the analog channel selector, into the digital modulated signal; and
- a digital filter for filtering the digital modulated signal, output from the over-sampling ADC, into a channel bandwidth corresponding to the selected transmission standard.

11. The multi-standard transceiver as set forth in claim 6, wherein the programmable ADC comprises:
- a programmable ADC for under-sampling and converting the analog modulated signal, filtered by the analog channel selector, according to the selected transmission standard; and
- a digital filter for filtering the digital modulated signal, output from the programmable under-sampling ADC, into a channel bandwidth corresponding to the selected transmission standard.

12. The multi-standard transceiver as set forth in claim 1, wherein the frequency synthesizing unit comprises:
- an oscillator for generating a local frequency in an RF band; a programmable divider for variably dividing the local frequency according to the selected transmission standard;
- a Digitally Compensated Crystal Oscillator (DCXO) for generating a reference frequency according to the selected transmission standard; and
- a frequency synthesizer for converting the frequency, output from the programmable divider, into the carrier frequency corresponding to the selected transmission channel using the reference frequency, and outputting the carrier frequency.

13. A muti-mode RF frequency front-end device for supporting a plurality of TDD wireless communication standards, and performing RF modulation/demodulation according to transmission standard and channel selected from the plurality of TDD wireless communication standards, comprising;
- a frequency synthesizing unit for variably adjusting a carrier frequency according to the selected transmission channel, and outputting the carrier frequency;
- a transmission unit for receiving a digital modulated signal, converting the digital modulated signal into a BB analog signal, low-pass-filtering the analog modulated signal with a bandwidth thereof variably adjusted according to the selected transmission standard, and up-converting the analog modulated signal into a Radio Frequency (RF) modulated signal corresponding to the selected transmission channel, using the carrier frequency;
- a reception unit for down-convening a received RF modulated signal to a BB analog modulated signal using the carrier frequency, low-pass-filtering the analog modulated signal with a bandwidth thereof being variably adjusted according to the selected transmission standard, and convening the filtered, analog modulated signal into a digital modulated signal;
- a transmission/reception switch outputting the RF modulated signal, input from the transmission unit, to an antenna, or outputting the RF modulated signal, received from the antenna, to the reception unit; and
- an intelligent channel selection block for selecting a transmission channel based on received signal strengths and frequency offsets of channels;

wherein an intelligent channel selection block comprises:
- a channel power measurement unit measuring received signal channel power on a network to which the transceiver belongs, and storing the received signal channel power as channel power data;

a channel list storage unit arranging all channels available on a network to which the transceiver belongs, and storing the channel list;

a channel selection data generation unit generating channel selection assign matrix (CSAM) which comprises of a sum of the differences between given received signal channel power and the power of interferers, including frequency offset parameter contribution with respect to each channel number for channel selection based on the signal channel power data and frequency offsets of channels in the channel list; and a channel selection unit selecting a highest priority channel from the channels of the channel list based on the channel selection assign matrix(CSAM) for channel selection.

14. The multi-mode RF frequency front-end device as set forth in claim 13, wherein the plurality of wireless communication standards include at least one of IEEE 802.11 b and IEEE 802.11g in 2.4 GHz band, and a portable Internet standard in 2.3 GHz band.

15. The multi-mode RF frequency front-end device as set forth in claim 14, wherein the portable Internet standard in 2.3 GHz band is HPi.

16. The multi-mode RF frequency front-end device as set forth in claim 13, wherein the transmission unit comprises:

a programmable DAC for converting the digital modulated signal, generated by the MMM, into the analog modulated signal with bit resolution thereof being variably adjusted according the transmission standard;

a waveform shaper for low-pass-filtering the analog modulated signal, output from the programmable DAC, with a bandwidth thereof being variably adjusted according the selected transmission standard;

a frequency up converter for up-converting the analog modulated signal, output from the waveform shaper, into an RF modulated signal corresponding to the selected transmission channel using the carrier frequency output from the frequency synthesizer; and a wideband power amplifier for amplifying the up-converted RF modulated signal.

17. The multi-mode RF frequency front-end device as set forth in claim 16, further comprising a DC corrector for correcting a DC component of the analog modulated signal output from the programmable DAC.

18. The multi-mode RF frequency front-end device as set forth in claim 13, wherein the reception unit comprises:

a wideband low noise amplifier for low-noise-amplifying the RF modulated signal output from the transmission/reception switch;

a frequency down converter for down-converting the RF modulated signal, output from the wideband low noise amplifier, into the analog modulated signal using the carrier frequency output from the frequency synthesizer;

an analog channel selector for low-pass filtering the analog modulated signal, output from the frequency down converter, with a bandwidth being variably adjusted according to the selected transmission standard; and a programmable ADC for converting the analog modulated signal, output from the analog channel selector, into the digital modulated signal with bit resolution thereof being variably adjusted in accordance with the selected transmission standard.

19. The multi-mode RF frequency front-end device as set forth in claim 18, wherein the analog channel selector comprises:

a programmable low-pass filter for low-pass-filtering the down-converted, analog modulated signal with a bandwidth thereof being variably adjusted to the selected transmission standard; and a programmable amplifier for variably amplifying the analog modulated signal, filtered by the programmable low-pass filter, according to the selected transmission standard.

20. The multi-mode RF frequency front-end device as set forth in claim 13, wherein the frequency synthesizing unit comprises:

an oscillator for generating a local frequency in an RF band;

a programmable divider for variably diminishing the local frequency according to the selected transmission standard;

a Digitally Compensated Crystal Oscillator (DCXO) for generating a reference frequency according to the selected transmission standard; and a frequency synthesizer for converting the frequency, output from the programmable divider, into a carrier frequency corresponding to the selected transmission channel using the reference frequency, and outputting the carrier frequency.

* * * * *

UNITED STATES PATENT AND TRADEMARK OFFICE
CERTIFICATE OF CORRECTION

| | |
|---|---|
| PATENT NO. | : 7,526,018 B2 |
| APPLICATION NO. | : 10/976900 |
| DATED | : April 28, 2009 |
| INVENTOR(S) | : Hae-Moon Seo et al. |

Page 1 of 1

It is certified that error appears in the above-identified patent and that said Letters Patent is hereby corrected as shown below:

Column 12, line 51, replace "convening" with -- converting --; and line 56, replace "convening" with -- converting --.

Signed and Sealed this

Fourteenth Day of July, 2009

JOHN DOLL
*Acting Director of the United States Patent and Trademark Office*